(12) United States Patent
Leprat (10) Patent No.: US 9,970,790 B2
(45) Date of Patent: May 15, 2018

(54) DEVICE FOR THE DIMENSIONAL INSPECTION OF CONTAINERS HAVING CONTACT OPTICAL DETECTION

(71) Applicant: MSC & SGCC, Vourles (FR)

(72) Inventor: Etienne Leprat, Sainte Foy les Lyon (FR)

(73) Assignee: MSC & SGCC, Vourles (FR)

( * ) Notice: Subject to any disclaimer, the term of this patent is extended or adjusted under 35 U.S.C. 154(b) by 205 days.

(21) Appl. No.: 14/903,123

(22) PCT Filed: Jul. 17, 2014

(86) PCT No.: PCT/FR2014/051830
§ 371 (c)(1),
(2) Date: Jan. 6, 2016

(87) PCT Pub. No.: WO2015/007993
PCT Pub. Date: Jan. 22, 2015

(65) Prior Publication Data
US 2016/0187165 A1    Jun. 30, 2016

(30) Foreign Application Priority Data

Jul. 18, 2013   (FR) .................................... 13 57062

(51) Int. Cl.
*G01D 5/58* (2006.01)
*G01B 5/08* (2006.01)
*G01B 5/06* (2006.01)
*G01B 11/08* (2006.01)

(52) U.S. Cl.
CPC ................. *G01D 5/58* (2013.01); *G01B 5/06* (2013.01); *G01B 11/08* (2013.01)

(58) Field of Classification Search
CPC ........... G01D 5/58; G01B 5/00; G01B 5/0002
USPC ......................................... 33/522, 1 BB, 542
See application file for complete search history.

(56) References Cited

U.S. PATENT DOCUMENTS

| 3,687,559 A | * | 8/1972 | Fischer | ..................... B07C 5/34 |
| | | | | 250/223 B |
| 3,815,248 A | | 6/1974 | Kulig | |
| 4,174,633 A | * | 11/1979 | Hoyt | ...................... G01B 5/252 |
| | | | | 33/520 |

(Continued)

FOREIGN PATENT DOCUMENTS

| FR | 2 818 748 | 6/2002 |
| FR | 2 965 344 | 3/2012 |

(Continued)

*Primary Examiner* — Christopher Fulton
(74) *Attorney, Agent, or Firm* — Clark & Brody (57) ABSTRACT

An inspection device comprises movable equipment driven relative to a frame and provided with external and internal inspection gauges. Detection systems are provided for detecting contacts occurring between the internal and external gauges and a container. Each detection system further comprises an emitter and receiver system for emitting and receiving a light beam in a direction parallel to the travel direction of the movable equipment. A movement transformation mechanism carried by the movable equipment is also provided for transforming the travel movement of the gauge relative to the movable equipment into a movement that obstructs or ceases to obstruct the light beam.

7 Claims, 7 Drawing Sheets

(56) References Cited

U.S. PATENT DOCUMENTS

| | | | | |
|---|---|---|---|---|
| 4,278,173 | A * | 7/1981 | Pemberton | B07C 5/124 |
| | | | | 209/522 |
| 4,790,662 | A * | 12/1988 | Bischkopf | B08B 9/42 |
| | | | | 250/223 B |
| 5,296,701 | A * | 3/1994 | Kirkman | G01N 21/9054 |
| | | | | 250/223 B |
| 6,108,924 | A * | 8/2000 | Jang | G01B 5/207 |
| | | | | 33/552 |
| 6,871,415 | B2 * | 3/2005 | Wendt | G01B 3/46 |
| | | | | 33/522 |
| 6,967,319 | B2 * | 11/2005 | Schmidt | B07C 5/122 |
| | | | | 209/526 |
| 7,317,524 | B2 * | 1/2008 | Gerard | G01N 21/9054 |
| | | | | 356/300 |
| 9,046,336 | B2 * | 6/2015 | Garin | G01B 5/08 |
| 9,233,797 | B2 * | 1/2016 | Herrmann | G01N 29/046 |
| 9,424,483 | B2 * | 8/2016 | Cocquelin | G01B 11/002 |

FOREIGN PATENT DOCUMENTS

| | | |
|---|---|---|
| FR | 2 973 107 | 9/2012 |
| GB | 1 432 120 | 4/1976 |
| JP | 2012-129454 | 7/2012 |
| WO | 2007/096585 | 8/2007 |
| WO | 2012/042175 | 4/2012 |

* cited by examiner

DEVICE FOR THE DIMENSIONAL INSPECTION OF CONTAINERS HAVING CONTACT OPTICAL DETECTION

The present invention relates to the technical field of inspecting hollow objects or containers in the general sense, such as for example bottles, jars, and vials, in particular when they are made of glass, in order to detect any dimensional or surface defects that might be presented by such a container.

In the technical field of inspecting containers, and in particular glass containers, provision is made, once they have been fabricated, to perform various inspections in particular of the mouth or of the ring of the container (inside/outside diameters, sealing, height), and of the neck of the container (inside diameter, inside profile, plugging).

In order to perform such inspections, it is known to use one or more devices, each having an inspection head for lowering either through a precise distance as a function of the nature of the container or else for coming into contact with the container, or indeed for coming to bear against the container during an inspection period. In conventional manner, such inspection is performed using a machine that presents either a linear conveyor suitable for holding the containers in precise positions, or else a star conveyor performing indexed circular motion in order to place the containers in association with various inspection stations. With a star conveyer, each inspection head is moved with reciprocating vertical motion, whereas with a linear conveyor, the inspection head is also capable of moving horizontally.

Patent FR 2 818 748 describes an inspection device having a head mounted on a horizontal slideway, which slideway is secured to a carriage that is moved with vertical reciprocating motion by a belt mounted between an idle pulley and a pulley driven by a servo-motor. One of the drawbacks of such a device is the relatively large mass that is moved, thereby limiting the speed and acceleration that can be imparted to the movement of the inspection head. As a result, the rate at which containers are inspected is limited, which represents a major drawback in lines for mass production of containers. Another drawback of such a prior art device appears when the inspection head is for coming into contact with a container. The stroke of the inspection head is undefined because of the dispersion in the height of the containers and because of defects that have an influence on the stroke, such as those that prevent the inspection head to move downwards while inspecting plugging. Thus, given the indeterminate nature of the stroke and given the moving mass, a considerable shock can occur between the inspection head and the container, which might damage the container and/or the inspection head. Finally, such a device does not enable the sources of any defects that are detected to be determined.

Patent GB 1 432 120 describes a device for inspecting containers that has a plurality of inspection stations, one of which is for inspecting dimensional compliance of the rings and the necks of the containers. That inspection station has movable equipment driven by a motor system with reciprocating motion relative to the frame of the device in a travel direction that is parallel to the axis of symmetry of the containers. That movable equipment is fitted with an external gauge for inspecting the outsides of the rings of containers, and an internal gauge for inspecting the insides of the rings and of the necks of containers.

The device described in Document GB 1 432 120 possesses the same drawbacks as the inspection device described by patent FR 2 818 748.

Patent application FR 2 174 203 also discloses a machine for inspecting the rings and the necks of containers, which device includes movable equipment driven by a motor system with cyclic reciprocating motion relative to a frame of the machine. The movable equipment is moved in a vertical direction parallel to the axes of symmetry of the containers. The movable equipment is fitted with a gauge or template for inspecting the outside of the ring. That template is mounted at the end of a bottom sleeve that is guided to move relative to the frame in reciprocating vertical sliding motion.

The movable equipment also has a top sleeve mounted coaxially inside the bottom sleeve and provided with a gauge for inspecting the neck. The top sleeve is driven with reciprocating vertical motion in order to engage the inspection gauge inside the mouth of the container.

Each sleeve is provided with a collar for passing inside a notch of a lever when both the template and the gauge are occupying a position that corresponds to a container without defect. If the container does not comply with the prescribed tolerances, one and/or the other of the sleeves occupies a position in which the collar actuates the lever, which in turn triggers a switch indicating that the dimensions of the bottle do not comply with the predetermined tolerances.

Such a device makes it possible to know whether the detected defect comes from the mouth or from the outside of the ring. Nevertheless, such a device does not make it possible to determine the nature of the dimensional defect detected by the gauge, such as for example a mouth that is too narrow or too wide, or of the defect detected by the template, such as for example a ring that is too large or too small.

Nevertheless, it is important to discriminate between the kinds of defect that are presented by defective containers in order to be able to take appropriate action on the process for fabricating the containers.

Patent application FR 2 973 107 describes a device for inspecting the dimensions of containers that makes use of a calibration head including in particular an external gauge and an internal gauge. Such a device also includes means for detecting a position difference between the internal gauge and the external gauge that makes it possible to characterize a bore defect. Those detection means include optical aiming means acting in a direction perpendicular to the travel of the movable equipment and including a light beam emitter and a facing receiver cell. The position difference of the internal gauge relative to the external gauge is detected by actuating a target that obstructs or does not obstruct the receiver cell. The cell thus detects the relative position of the gauges when the movable equipment is in its low position, the gauges normally being in maximum contact with the container. Such a device makes it possible to detect bore diameter defects. Nevertheless, such a device does not make it possible to determine that rings and/or necks of containers have dimensions that are in compliance, nor does it make it possible to detect the various different types of defect for containers that are not dimensionally in compliance, such as height, plug inside diameter, bore diameter, and outside diameter.

Patent application FR 2 965 344 describes an inspection device for inspecting the rings and necks of containers, which device has movable equipment driven with reciprocating motion relative to a frame in a travel direction that is parallel to the axes of symmetry of the containers. The movable equipment is provided with an external gauge for inspecting the outsides of the rings of containers, and with an internal gauge for inspecting the insides of the rings and the necks of containers. The external and internal gauges are mounted to move independently of each other and relative to the movable equipment in a travel direction parallel to the travel direction of the movable equipment.

Such a device also includes a measurement system acting in the travel direction for measuring the position of the movable equipment relative to the frame. That device also includes a detection system for detecting contact occurring between the internal gauge and the container during movement of the movable equipment and enabling occurrences of contact to be detected between the internal gauge and the container. Likewise, that device includes a detection system for detecting contact between the external gauge and the container during the movement of the movable equipment, and enabling occurrences of contact to be detected between the external gauge and the container. As a function of the measured positions of the movable equipment and of the occurrences of contact between the gauges and the container, the processor unit of that device can determine whether or not the rings and/or the necks of the containers have dimensions that are in compliance, and it can also determine the types of defect for containers that are not dimensionally in compliance.

Each contact detection system comprises a sensor having one portion secured to the movable equipment and another portion secured to the gauges. The contact sensor thus detects that the portions of the sensor are caused to face each other at the moment of contact between a gauge and the container. The drawbacks of such a device are associated with the way the sensor is mounted on the movable equipment, which requires an electrical connection to be established between the movable sensor and the stationary processor unit. Apart from the drawback associated with the extra load to be moved, the speeds and the accelerations of the movable equipment impose constraints on the sensor carried thereby, which lead to the sensor being fragile.

Furthermore, in the prior art, it is known in particular from Documents WO 2007/096585 and JP 2012 129454 to use optical sensors that include a light emitter and a light receiver. Such optical sensors serve to detect the presence of an object occupying a position between the light emitter and the light receiver. Such sensors that detect the presence of an object do not give information about the occurrence of contacts between the gauges and the containers, and such information is essential for verifying that the dimensions of the rings and the necks of containers are in compliance.

The object of the present invention seeks to remedy the drawbacks of the prior art by proposing a device that makes it possible to inspect the rings and the necks of containers at a high rate in order to verify that the rings and the necks of the containers have dimensions that are in compliance and in order to determine the types of defect that are detected, if any, while such a device remains strong, accurate, and compact.

In order to achieve this object, the invention provides an inspection device for inspecting the rings and the necks of containers, the device comprising:

movable equipment driven relative to a frame with reciprocating motion along a travel direction parallel to the axis of symmetry of the containers and with a maximum stroke, the movable equipment being provided with an external gauge for inspecting the outsides of the rings of containers and with an internal gauge for inspecting the insides of the rings and of the necks of containers, the external and internal gauges being mounted to be movable independently of each other and relative to the movable equipment in a travel direction parallel to the travel direction of the movable equipment;

a measurement system for measuring the position of the movable equipment relative to the frame, in the travel direction, the measurements of the position of the movable equipment being supplied to a processor unit;

a detection system for detecting contact occurring between the internal gauge and the container during movement of the movable equipment, occurrences of contact being supplied to the processor unit;

a detection system for detecting contact occurring between the external gauge and the container during movement of the movable equipment, occurrences of contact being supplied to the processor unit; and a processor unit acting as a function of the measurements of the position of the movable equipment and of occurrences of contact between the gauges and the container to determine whether the rings and/or the necks of the containers have dimensions that are in compliance and to determine the types of defect for containers that are dimensionally not in compliance.

According to the invention, each detection system for detecting contact with a gauge comprises:

an emitter and receiver system for emitting and receiving a light beam in a direction parallel to the travel direction of the movable equipment and over a segment of length that is not less than the maximum stroke of the movable equipment, the emitter and receiver system being carried by the support; and a movement transformation mechanism carried by the movable equipment, for transforming the travel movement of the gauge relative to the movable equipment into a movement that obstructs or ceases to obstruct the light beam in order to detect the occurrence of contact with the gauge regardless of the position of the movable equipment.

Furthermore, the device of the invention also includes in combination at least one and/or another of the following additional characteristics:

the movement transformation mechanism transforms the linear travel movement of the gauge into pivoting movement of a target in a plane containing the light beam;

the movement transformation mechanism includes a scissors linkage hinged and mounted between the movable equipment and the gauge;

the movement transformation mechanism transforms the linear travel movement of the gauge into rotary movement in a plane perpendicular to the direction of the light beam;

the movement transformation mechanism includes a helical connection associated with a planar linkage;

the emitter and receiver system for emitting and receiving the light beam comprises an emitter and a receiver for a light beam that are mounted facing each other and that are spaced apart from each other by at least the maximum stroke of the movable equipment; and the emitter and receiver system for emitting and receiving the light beam comprise an emitter and a receiver of the light beam that are mounted together with an optical reflector being mounted opposite them.

Various other characteristics appear from the following description given with reference to the accompanying drawings which show embodiments of the invention as non-limiting examples.

Figure 1:
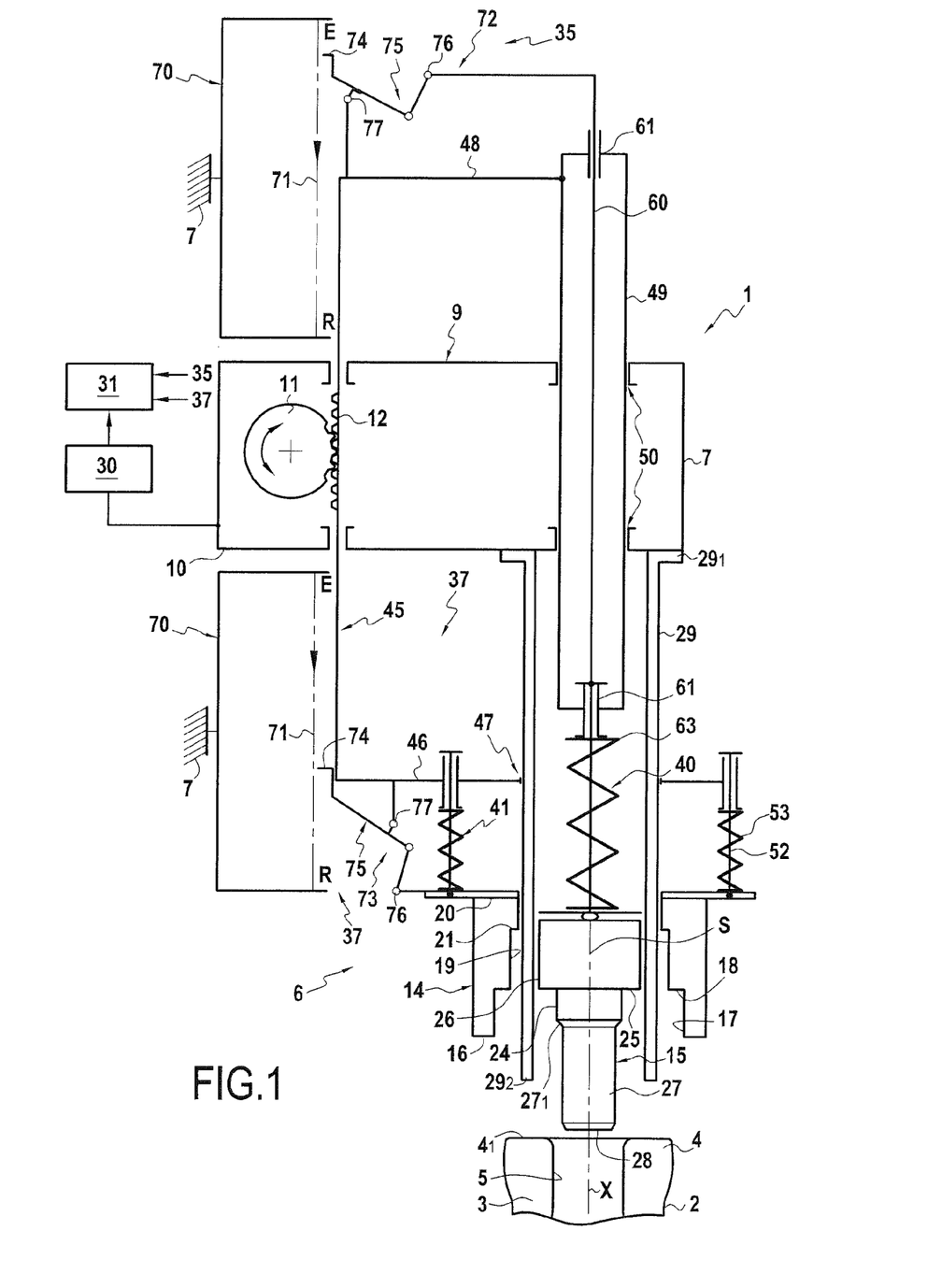
FIG. 1 is a diagrammatic elevation view in section of the inspection device in accordance with the invention in its high position relative to a container.

As can be seen more clearly in FIG. 1, the subject matter of the invention relates to an inspection device 1 enabling hollow containers 2 to be inspected at a high rate, which containers may be of any suitable kind, e.g. being made of glass and presenting an axis of symmetry X. In conventional manner, each container 2 presents a neck 3 having a ring 4 defining the inside of an opening 5 giving access to the inside of the container 2. More precisely, the inspection device 1 serves to inspect the neck 3 and the ring 4 of a container 2 in order to determine that the rings and the necks of containers have compliant dimensions, and in order to determine the types of defect for containers of non-compliant dimensions.

The inspection device 1 is for fitting to any container production machine in which containers are delivered into register with the inspection device 1 at a high rate by using any appropriate means. The production machine and the means for bringing containers to the inspection device 1 and the means for handling containers are not described since they are well known to the person skilled in the art and they do not specifically form part of the subject matter of the invention. The inspection device 1 is mounted on the structure of an inspection machine that is incorporated in or added to the production machine. In the example shown, it is should be observed that the containers 2 are brought into register with the inspection system 1 in an upright or vertical position such that the axis X of symmetry of a bottle can be considered as extending in a vertical direction.

The inspection device 1 includes equipment 6 that is movable relative to a support frame 7. The movable equipment 6 is driven by a motor system 9 for imparting reciprocating motion to the movable equipment in a travel direction parallel to the axis of symmetry X of the containers 2. In the example shown, the movable equipment 6 thus presents, in association with each container 2, a downward movement and an upward movement in a travel direction that is vertical since the bottle 2 occupies an upright position while it is being inspected by the device 1 of the invention. Naturally, the device 1 is suitable for inspecting bottles placed in various positions.

According to a preferred embodiment characteristic, the motor system 9 comprises a servo-motor 10 having its body secured to the support frame 7. The servo-motor 10 has an outlet pinion 11 co-operating with a rack 12 forming part of the movable equipment 6. The servo-motor is controlled to drive its outlet pinion 11 in rotation in one direction and in the opposite direction in order to impart downward and upward motion cyclically to the rack 12 along the vertical axis.

The movable equipment 6 includes an external gauge for inspecting the outsides of the rings 4 of containers, and an internal gauge 15 for inspecting the insides of the rings and the necks of containers 2. As explained in the description below, the gauges 14 and 15 are driven in reciprocating motion by the movable equipment 6 in order to come into contact with a container 2 during the downward movement of the movable equipment 6.

More precisely, the gauges 14 and 15 are mounted concentrically and they possess a common axis of symmetry S extending in a vertical direction so that in an inspection position, the axis of symmetry X of the container 2 and the axis of symmetry S are in alignment. On each downward movement of the movable equipment 6 along the vertical axis X, the gauges 14 and 15 inspect the dimensions of the ring and of the neck of the container that is present. Advantage is taken of the upward movement of the movable equipment to remove the inspected container and to bring into place the next container for inspection.

Figure 5A:
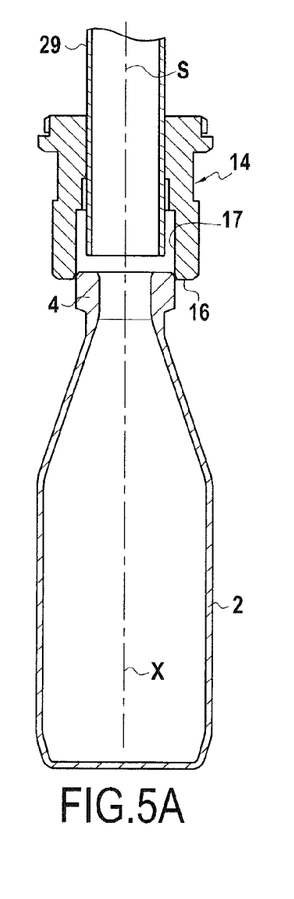
FIGS. 5A through 5H are elevation views in sections showing various configurations of the inspection device corresponding respectively to: inspecting a defective ring diameter corresponding to a ring that is too large; correct bore and correct ring diameter; inspecting a defective ring diameter corresponding to a ring that is too small; defective bore corresponding to a bore that is too small; defective bore corresponding to a bore that is too great; defective bore corresponding to a choke neck bore; extracting the tooling; and detection corresponding to no container.

The external gauge 14 is in the form of a bell of annular shape centered on the axis of symmetry S. The external gauge 14 presents a bottom end referred to as an introduction end 16 defining a calibration opening or bore 17. The inside diameter of the calibration opening 17 is equal to the greatest acceptable diameter for the ring 14 of a container. Thus, as shown in FIG. 5A, if the ring 4 of the container presents a diameter greater than the diameter of the calibration opening 17 (ring too large), then the ring 4 of the container comes into abutment against the bottom end 16 of the external gauge 14.

The calibration opening 17 is defined by an inside shoulder 18 for coming into contact against or pressing against the mouth or rim 4$_1$ of the ring 4.

In a preferred embodiment, the external gauge 14 also has an escape opening or bore 19 arranged beyond the shoulder 18 and communicating with the calibration opening 17 and opening out at the second end 20 of the external gauge opposite from its bottom first end 16. This escape opening 19 is provided with a stop shoulder 21 situated between the second end 20 and the shoulder 18.

Figure 5B:
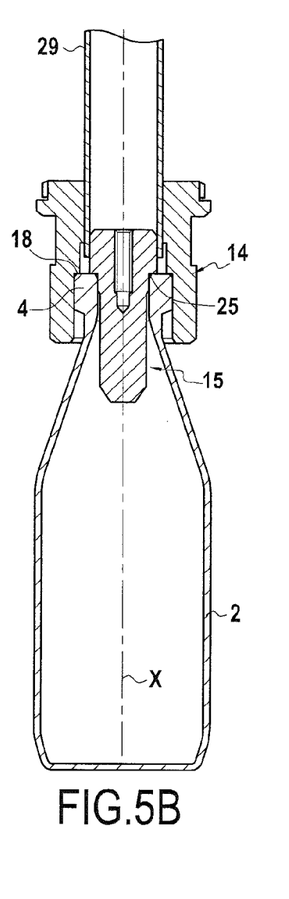

Thus, the calibration opening 17 and the escape opening 19 define between them the annular shoulder 18, which is of width that corresponds to the tolerance range for the width of compliance rings 4 (FIG. 5B). In other words, under all circumstances in which the ring 4 presents a compliant diameter, the external gauge 14 comes to bear via its shoulder 18 against the rim 4$_1$ of the ring 4. When the ring 4 presents a diameter that is less than the diameter of the escape opening 19 (FIG. 5C), then the escape opening 19 of the external gauge 14 receives the ring 4 which then comes into contact with the external gauge 14 either via the bottom end 16 or else via the stop shoulder 21.

The internal gauge 15 is in the form of a pin or plunger mounted inside the external gauge 14 in concentric manner relative to the external gauge 14. The gauge 15 is symmetrical in shape centered on the axis of symmetry S, and it defines a bottom segment 24 that is separated by a shoulder 25 from a top segment 26. The diameter of the top segment 25 is greater than the diameter presented by the bottom segment 24. The diameter of the bottom segment 24 presents a diameter corresponding to the minimum diameter that can be accepted for the mouth of the container 2, while the diameter of the top segment 26 corresponds to the maximum diameter that can be accepted for the mouth of the container. Thus, the annular shoulder 25 that is defined between the top and bottom segments 26 and 24 presents a width that corresponds to the tolerance range for the inside diameter of the neck of the container. When the neck 3 presents a diameter that lies within the tolerance range, then the internal gauge 15 comes into abutment via its shoulder 25 against the rim $4_1$ of the ring (FIG. 5B).

In a preferred embodiment, starting from the bottom segment 24, and the internal gauge 15 also presents, an end segment 27 of diameter that is less than the diameter of the bottom segment 24. The end segment 27, which possesses a free or "abutment" end 28, is connected to the bottom segment 24 by a connection collar $27_1$.

Figure 5C:
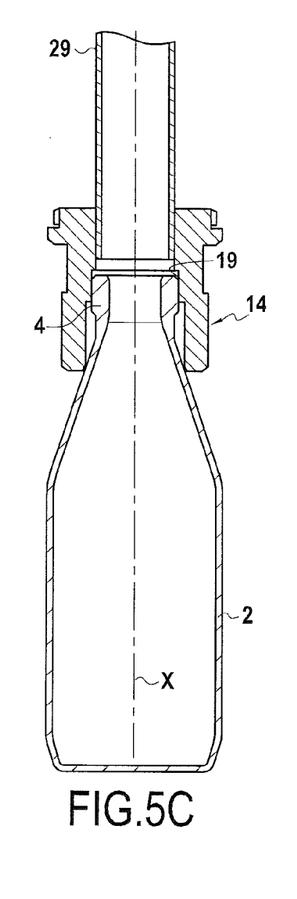
Figure 5D:
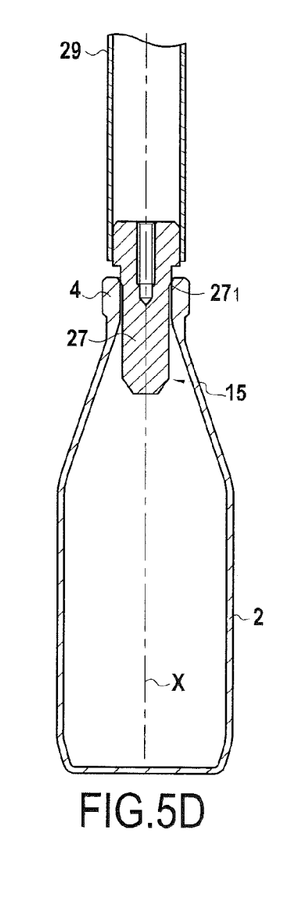
Figure 5E:
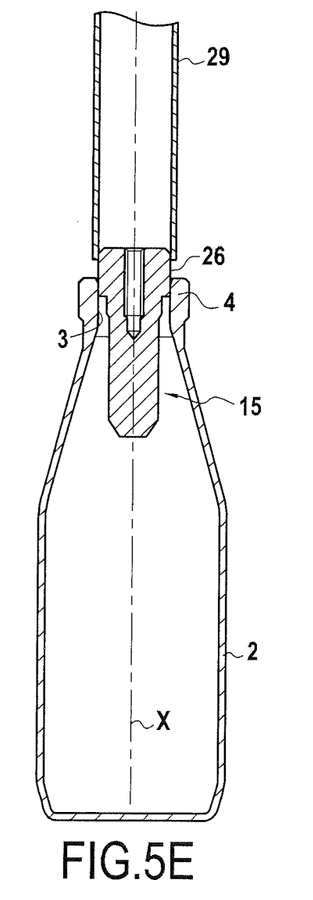
Figure 5F:
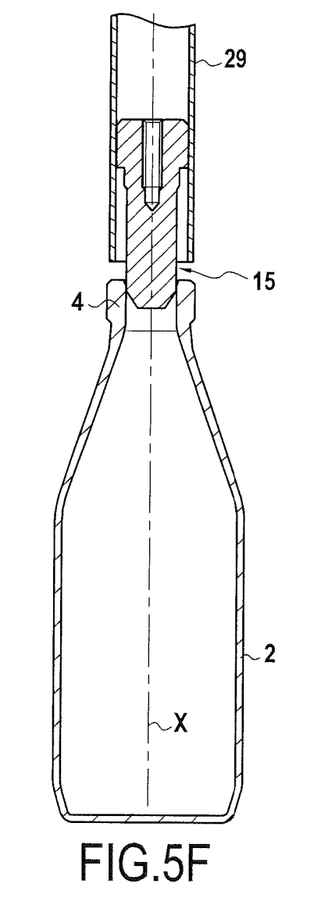

When the neck 3 of the container 2 presents a diameter that is too small, then the pin comes into abutment via its end segment 27 and in particular via its connection collar $27_1$ against the container 2 (FIG. 5D). If the inside diameter of the neck 3 is greater than the maximum diameter of the tolerance range, then the top segment 26 penetrates inside the neck 3 of the container (FIG. 5E). Furthermore, when the neck of the container presents a bore defect (FIG. 5F), the internal gauge 15 comes into abutment via the rim of the ring against the end segment 27.

According to a preferred embodiment characteristic, an extractor tube 29 is interposed between the external gauge 14 and the internal gauge 15. This extractor tube 29 has a first end $29_1$ fastened to the frame 7 so that its longitudinal axis of symmetry coincides with the axis of symmetry S. The extractor tube 29 has a second end $29_2$ opposite from the first end $29_1$ and extending between the internal gauge 15 and the external gauge 14. In other words, the external gauge 14 extends outside the extractor tube 29 while the internal gauge 15 extends inside the extractor tube 29.

Figure 5G:
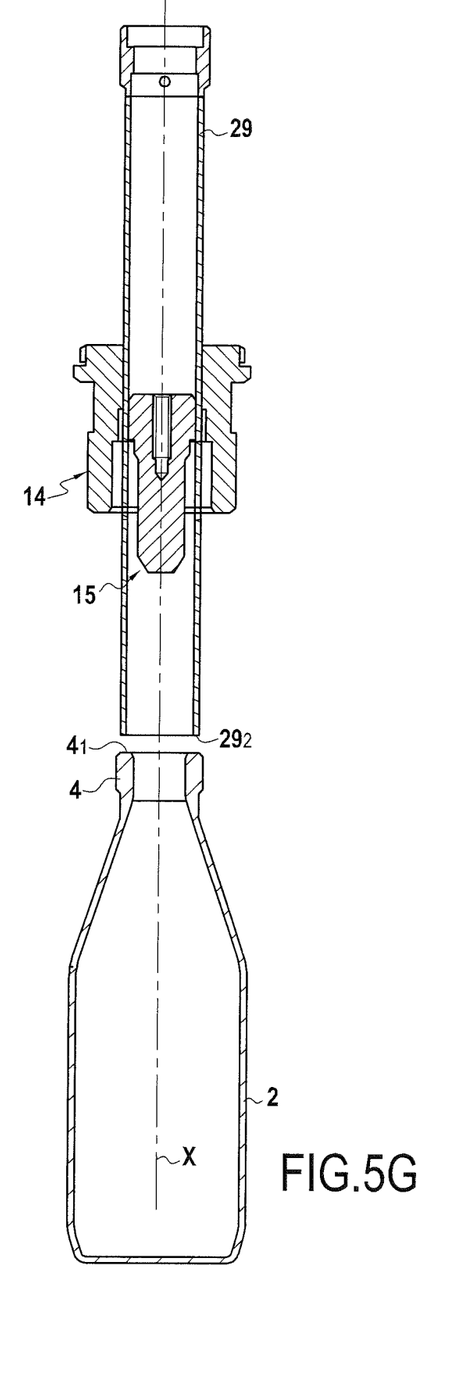

The diameter of the extractor tube 29 is selected to enable it to come into contact with the rim $4_1$ of the ring 4 in the event of the container rising with the movable equipment 6 so as to disengage the container from the movable equipment 6 (FIG. 5G).

It should be observed that the external gauge 14 and the internal gauge 15 detect each defect at a given position in their movement along the vertical axis that differs from one defect to another. Thus, by way of example, the internal gauge 15 occupies a greater altitude on detecting a choked neck (FIG. 5F) than the altitude it occupies when the internal gauge 15 detects a neck of correct dimensions (FIG. 5B). Likewise, the external gauge 14, on detecting a ring diameter that is too great (FIG. 5A), occupies a position that is at an altitude greater than the position occupied by said external gauge 14 on detecting a ring diameter that is too small (FIG. 5C).

The inspection device 1 also has a system 30 for measuring the position of the movable equipment 6 relative to the frame in the travel direction of the movable equipment. The system 30 may be implemented by any means enabling the position of the movable equipment along the travel axis to be known. In a preferred variant embodiment, the measurement system 30 comprises a position sensor forming part of the servo-motor 11. Such a measurement system 30 thus enables the position of the movable equipment 6 relative to the frame 7 to be known and consequently enables the position of the internal and external gauges 15 and 14 to be known, in the vertical direction in the example shown. In other words, such a measurement system 30 serves to give an abscissa position for the movable equipment 6 relative to an origin along a distance measurement scale extending along the vertical axis.

The measurement system 30 is connected to a processor unit 31 of any known type, e.g. in the form of a microcomputer. The measurement system 30 thus provides the processor unit 31 with measurements of the position of the movable equipment 6. Insofar as the positions of the gauges 14 and 15 relative to the movable equipment 6 are known, the processor unit 31 knows the positions of the gauges 14, 15 relative to the stationary frame.

The inspection system 1 also has a contact detection system 35 for detecting contact between the internal gauge 15 and the container 2 during movement of the movable equipment 6. This detection system 35 is connected to the processor unit 31. The processor unit 31 is thus capable of detecting contact occurring between the internal gauge 15 and the container 2.

The inspection system 1 also has a contact detection system 37 for detecting contact between the external gauge 14 and the container 2 during movement of the movable equipment 6. This detection system 37 is connected to the processor unit 31. The processor unit 31 is thus capable of detecting contacts occurring between the external gauge 14 and the container 2.

Furthermore, the external gauge 14 and the internal gauge 15 are mounted to be movable along the travel direction independently of each other and relative to the movable equipment 6. In other words, it must be understood that each gauge 14, 15 is capable of moving individually along the vertical travel direction in the event of the gauge coming into contact with the container 2.

In advantageous manner, the inspection device 1 includes an internal damper mechanism 40 for damping contact between the container 2 and the internal gauge 15 and for returning said internal gauge into position. The inspection device 1 also has an external damper mechanism 41 for damping contact between the container 2 and the external gauge 14 and for returning the external gauge to position. Each damper and return mechanism 40, 41 is thus suitable firstly for damping contact when it occurs between a gauge 14, 15 and the container 2, and secondly for returning each gauge 14, 15 into its initial or rest position in the absence of contact with the container 2.

As can be seen more precisely in FIG. 1, the external gauge 14 and the internal gauge 15 are mounted to be movable along the travel direction relative to a support 45 for the movable equipment 6. This support 45, which is naturally movable relative to the stationary frame 7, includes the rack 12 having its bottom end secured to a part 46 for holding and guiding the external gauge 14. This guide part 46 in the example shown is in the form of a plate having a through hole 47 for passing the extractor tube 29, thereby allowing the plate 46 to perform vertical sliding movement relative to the stationary extractor tube 29. The top end of the rack 12 is securely mounted by a connection part 48 to a guide jacket 49 extending substantially parallel to the rack 12. This jacket 49 is guided to move in vertical sliding relative to the frame 7 by guide members 50 of any known type. The jacket 49 is mounted so as to extend at least in part inside the extractor tube 29.

The support 45 is thus formed by the rack 12, the connection part 48, the jacket 49, and the plate 46. The external gauge 14 and the internal gauge 15 are mounted to move independently of each other relative to the support 45 and with the help of respective ones of the damping and return mechanisms 41 and 40.

Thus, by means of the damping and return mechanism 41, the external gauge 14 is provided with at least one, and in the example shown three, guide shafts 52 that are movably mounted relative to the plate 46. Each shaft 52 is provided with a return spring 53 interposed between the external gauge 14 and the plate 46 in order to return the external gauge 14 into its rest position.

Figure 2:
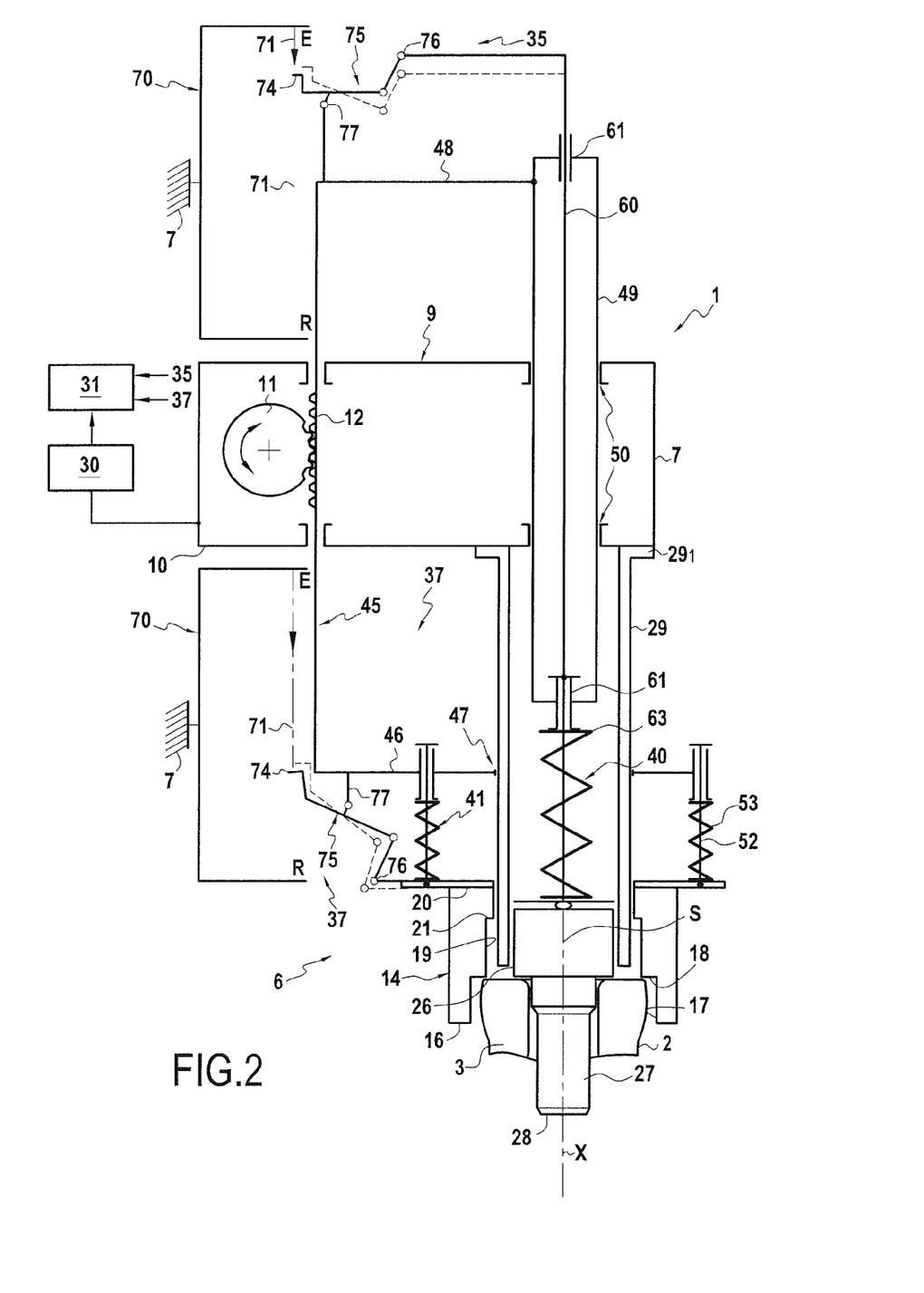
FIG. 2 is a diagrammatic elevation view in section of the inspection device in accordance with the invention in its position for inspecting a container.

In the absence of contact between the external gauge 14 and the ring 4 of a container, the external gauge 14 occupies a rest position relative to the support 45, which position is determined by the return springs 53 and by an abutment carried by the shafts 52 and coming to bear against the plate 46 (FIG. 1). During contact between the external gauge 14 and the ring 4, the external gauge 14 is subjected to a force causing the external gauge 14 to rise relative to the support 45, thereby compressing the return springs 53 (FIG. 2). While the movable equipment 6 is moving upwards, the thrust of the ring 4 against the external gauge 14 disappears so that the return springs 53 cause the external gauge 14 to return to its initial rest position.

The damping and return mechanism 40 has a rod 60 presenting a bottom first end that is secured to the internal gauge 15. This rod 60 is mounted inside the jacket 49, which makes use of any appropriate guide means 61 to guide the rod 60 in sliding relative to the jacket 49.

Between the internal gauge 15 and the bottom end of the jacket 49, the rod 60 advantageously includes a spring 63. In the absence of contact between the internal gauge 15 and the container 2, the spring 63 acts on the internal gauge 15 so that it occupies a rest position relative to the guide jacket 49. The rod 60 is held in this position by means of an abutment carried by the rod and coming to bear against the jacket 49 (FIG. 1). In the event of the internal gauge 15 coming to bear against the ring 4, the internal gauge 15 is subjected to a force causing the rod 60 to move upwards relative to the guide jacket 49 (FIG. 2). In the event of thrust between the gauge 15 and the ring 4 coming to an end, the spring 63 tends to return the internal gauge 15 to its initial rest position.

In accordance with the invention, each detection system 35, 37 for detecting contact between a gauge 15, 14 and the container 2 includes an emitter and receiver system 50 for transmitting and receiving a light beam 71 in a direction parallel to the travel direction of the movable equipment 6. According to a characteristic of the invention, the emitter and receiver systems 70 are mounted on the frame 7 in stationary manner. Each light beam 71 is created along a segment of length that is not less than the maximum stroke of the movable equipment 6 so as to make it possible, as explained in the description below, to detect the occurrence of contact anywhere along the stroke of the movable equipment 6.

Each detection system 35, 37 for detecting contact against a gauge includes a respective transformation mechanism 72, 73 for transforming the travel movement of a gauge 15, 14 relative to the movable equipment 6 into a movement that obstructs or ceases to obstruct the light beam 71 in order to detect contact occurring with the gauge, regardless of the position of the movable equipment 6. Each transformation mechanism 72, 73 is carried or supported by the movable equipment 6.

In a variant embodiment shown in the drawings, in the absence of relative movement between the movable equipment 6 and a gauge 15 or 14, the light beam 71 is not obstructed or affected by the movement transformation mechanism 72, 73. In contrast, as soon as a gauge moves as a result of coming into contact with the container, the movement transformation mechanism 72, 73 is operated to obstruct the light beam 71 in order to detect that contact has occurred. In other words, the movement transformation mechanism 72, 73 creates an obstruction in the light beam so that the change of obstruction state in the light beam as detected by the emitter and receiver system 70 serves to signal that the gauge has come into contact.

In another variant embodiment of the invention, the light beam 71 is obstructed by the movement transformation mechanism 72, 73 in the absence of relative movement between the movable equipment 6 and a gauge 15 or 14. Each detection system 35, 37 for detecting contact of a gauge includes a respective movement transformation mechanism 72, 73 for transforming the travel movement of a gauge 15, 14 relative to the movable equipment 6 into movement that eliminates or removes the obstruction of the light beam 71. Thus, the change in the beam obstruction state is detected by the emitter and receiver system 70, which indicates that the gauge has come into contact by means of the emitter and receiver system 70, regardless of the position of the movable equipment 6. In other words, an occurrence of contact causes a gauge 15, 14 to move relative to the movable equipment 6 so that the movement transformation mechanism 72, 73 allows the light beam 71 to pass. This way of detecting contact by passing the beam is the inverse (or dual) of detecting by obstructing the beam, and is equivalent thereto.

In general manner, each movement transformation mechanism 72, 73 includes a target 74 suitable:
  in the absence of a movement of the gauge, for occupying a rest first position in which the target 74 is disengaged from the light beam 71 (FIG. 1), or in which the target 74 obstructs the light beam 71; and
  in the presence of relative movement between a gauge and the movable equipment 6, for occupying a second position referred to as a "detection" position in which the target 74 obstructs the light beam 71 (FIG. 2), or respectively in which the target 74 ceases to obstruct the light beam 71.

Advantageously, each movement transformation mechanism 72, 73 is of the mechanical type, i.e. it does not require any electrical or mechanical connection between the movable equipment 6 and the stationary frame 7. For this purpose, the movement transformation mechanisms 72, 73 are interposed between the movable equipment 6 and the gauges 14, 15 or members that are associated therewith.

In the example shown in FIGS. 1 and 2, the movement transformation mechanisms 72, 73 transform the linear travel movement of the gauges into pivoting movement of the respective target 74 in a plane containing a light beam. In this example, each movement transformation mechanism 72, 73 comprises a hinged scissors linkage 75 mounted between the movable equipment 6 and a gauge 14, 15. As can be seen in the example shown in FIGS. 1 and 2, the movement transformation mechanism 72 of the internal gauge 15 has scissors 75 with a first branch connected via a hinge 76 to the end of the rod 60 projecting from the jacket 49 and remote from the bottom first end that is secured to the internal gauge 15. The second branch of the scissors 75 is provided with the target 74 at its end opposite from its end connected via a pivot to the first branch, and it is connected by a hinge 77 to the movable equipment 6, and in particular to the connection part 48.

The transformation mechanism 73 of the external gauge 14 includes scissors 75 having a first branch connected by a hinge 76 to the second end 20 of the external gauge 14. The second branch of the scissors 75 is provided with the target 74 at its end opposite from its end connected by a pivot to the first branch, and it is connected by a hinge 76 to the movable equipment 6, and in particular to the part 46 that serves to hold the external gauge 14.

Figure 4:
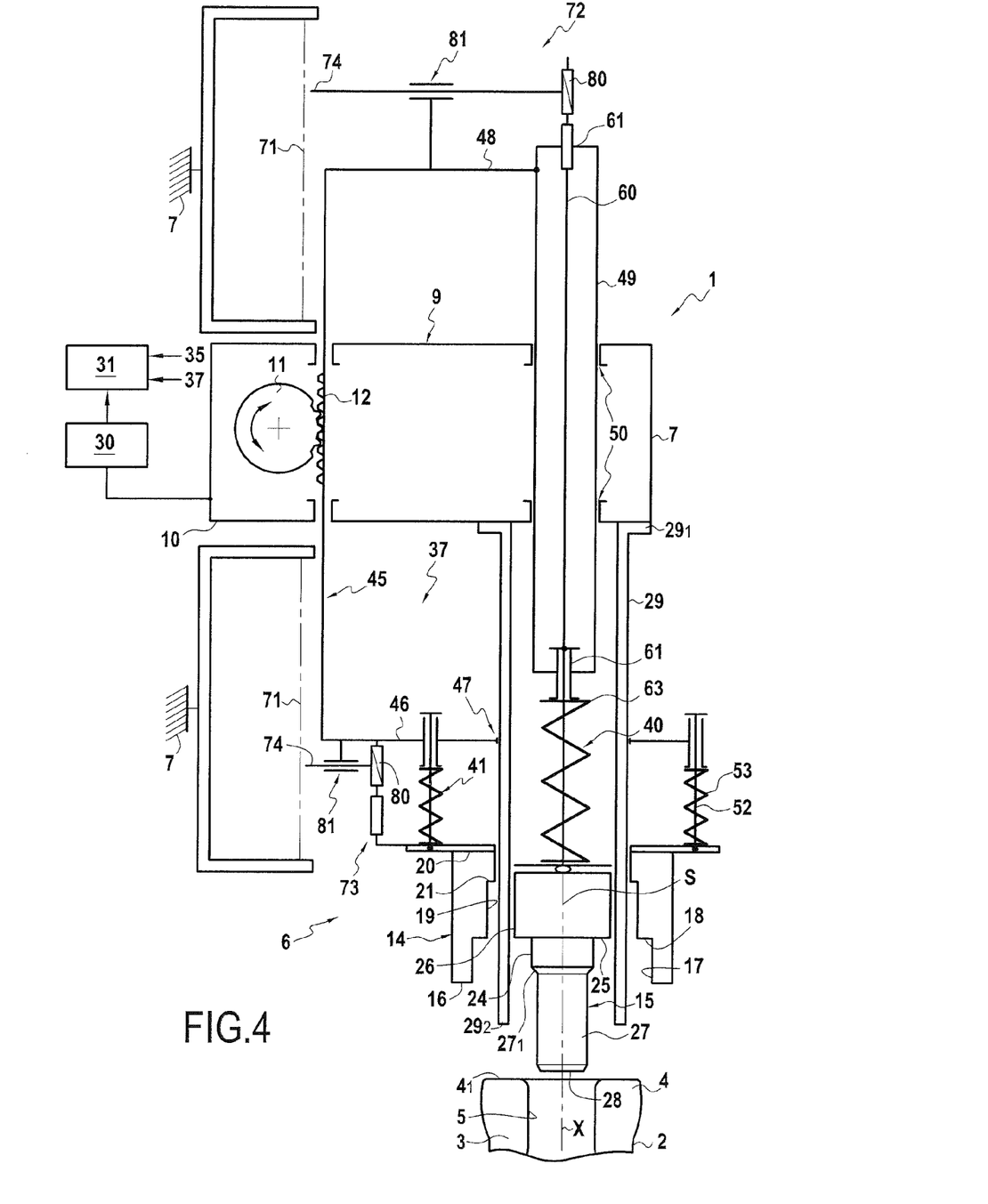
FIG. 4 is a diagrammatic elevation view in section showing another embodiment of a motion transformation mechanism forming part of the detection system in accordance with the invention.

In the example shown in FIG. 4, each movement transformation mechanism 72, 73 transforms the linear travel movement of the gauges into rotary movement in a plane perpendicular to the direction of the light beam 71. In this example as shown, the movement transformation mechanisms 72, 73 include respective helical connections 80 associated with a planar linkage so as to enable the target 74 to be moved with a rotary movement in a plane perpendicular to the direction of the light beam 71. Thus, for the transformation mechanism 72 for transforming movement of the internal gauge 15, the sliding element of the helical connection 80 is connected to the end of the rod 60 that projects from the jacket 49, while the rotary element is connected to the movable element of the planar linkage 81 carrying the target 74. The movable element of the planar linkage is guided by the connection part 48.

Likewise, for the transformation mechanism 73 for transforming the movement of the external gauge 14, the sliding element of the helical connection 80 is connected to the second end 20 of the external gauge 14, while the rotary element is connected to the movable element of the planar linkage 81 that carries the target 74. The movable element of the planar linkage 81 is guided by the part 46.

Naturally, the transformation mechanisms 72, 73 may be made in manners other than those shown in the drawings. Likewise the emitter and receiver system 71 for transmitting and receiving the light beam may be made in any appropriate manner. For example, in the example shown in FIGS. 1 and 2, the emitter and receiver system 70 for transmitting and receiving the light beam 71 includes a light beam emitter E and a light beam receiver R that are mounted facing each other while spaced apart by not less than the maximum stroke of the movable equipment, such a system commonly being referred to as a light barrier or a fork.

Figure 3:
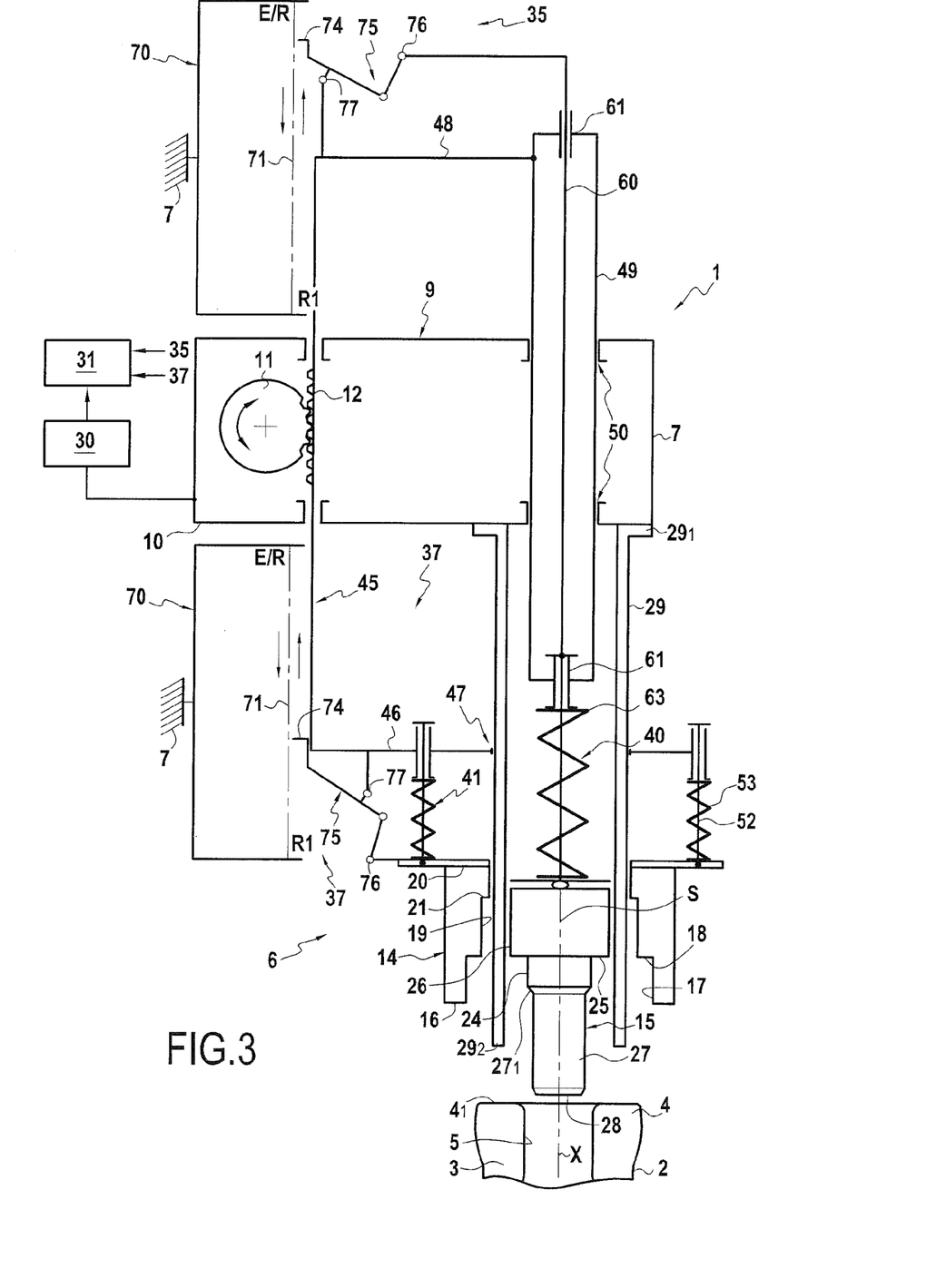
FIG. 3 is a diagrammatic elevation view in section showing a variant embodiment of the light beam emitter and receiver system.

In the example shown in FIG. 3, the system 70 for emitting the light beam 71 includes a light beam emitter E and receiver R that are mounted together and opposite from or facing a light reflector $R_1$.

The occurrences of contact as detected by the detection systems 35, 37 are transmitted to the processor unit 31 which is capable, on the basis of the measurements delivered by the system 30 for measuring the position of the movable equipment 6, of determining whether the rings and the necks of containers 2 have dimensions that are in compliance. Each contact position of the gauges 14, 15 corresponds to a different dimensional inspection of the ring and of the neck of the container. By using a calibration operation, it is possible to determine the theoretical vertical positions for the gauges 14 and 15 that correspond to a container without defect, and consequently also the positions that correspond to a container with a defect.

Since the position of the movable equipment 6 is known relative to the frame 7, i.e. also relative to the plane on which the containers 2 stand, the processor unit is suitable for determining the heights of the containers on the basis of contacts occurring between the external gauge 14 and the ring of the container and/or contacts occurring with the internal gauge 15.

The operation of the inspection device 1 stems directly from the above description.

After bringing a container 2 into register with the inspection device 1, the motor system 9 is controlled to lower the movable equipment 6. As soon as a gauge 14, 15 comes into contact with the container 2, that contact is detected by the associated detection system 35, 37. At that instant, by means of the measurement system 30, the processor unit 31 knows the position of the gauge that has come into contact with the container, thereby enabling the processor unit 31 to determine whether the dimensions of the container are in compliance and to determine the types of defect it detects on containers that are dimensionally not in compliance. Advantageously, as a function of contacts being detected with the two gauges 14, 15 and as a function of the measurement system 30, the processor unit 31 knows the positions of the movable equipment 6 at the instants the gauges 14, 15 come into contact with the container 2. Using these measurements and the occurrences of contact, the processor unit 31 performs calculations giving additional dimensional information about the necks and the rings of the containers 2, and in particular about the types of defect that are presented by the containers 2.

Thus, as a function of the vertical position occupied by each of the gauges 14, 15 on making at least one contact with the container, the processor unit 31 is in a position to determine precisely whether the ring and the neck of the container have dimensions that are in compliance. As explained above, as a function of the vertical position occupied by each of the gauges 14, 15 when at least one contact occurs with the container, the processor unit 31 is capable of determining precisely whether the ring and the neck of the container have dimensions in compliance, since it is possible to determine defect types from among the following:

a defect of the inside diameter of the neck that is less than a minimum acceptable diameter (a "plug" defect);

a defect of the bore diameter being less than a minimum acceptable diameter (a "bore" defect);

a defect of the bore diameter being greater than a maximum acceptable diameter (a "bore" defect);

a height defect greater than a maximum acceptable height;

a height defect less than a minimum acceptable height;

an outside diameter defect less than a minimum acceptable diameter; and an outside diameter greater than a maximum acceptable diameter.

Figure 5H:
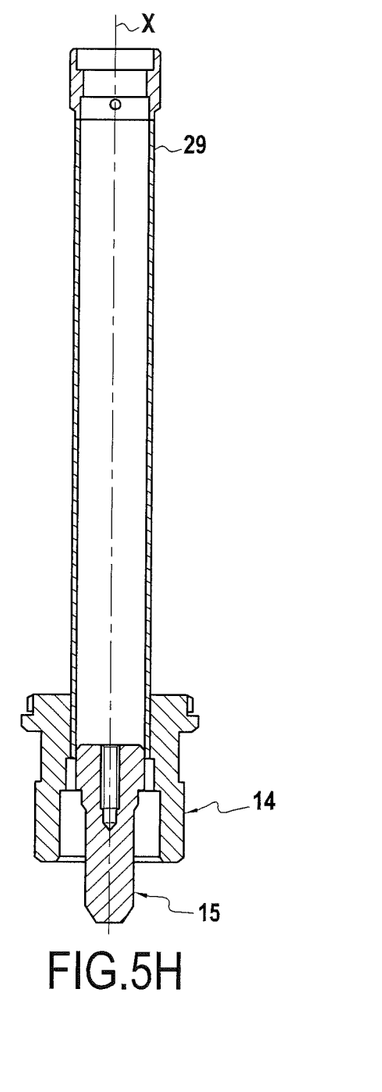

It should be observed that as a result of detecting contact between one and/or both of the gauges 14, 15 with the container 2, and depending on the measured position of the movable equipment 6, the processor unit 31 can reverse the travel direction of the motor system so as to cause the movable equipment 6 to rise. In practice, for containers of dimensions that are in compliance, the gauges 14 and 15 come into contact with the container 2 substantially simultaneously. When there is no container (FIG. 5H), none of the detection systems 35, 37 detect contact. The processor unit 31 can then cause the movable equipment 6 to move upwards by controlling the motor system 9 once the movable equipment 6 has reached a previously determined low vertical position.

The invention is not limited to the embodiments described and shown since various modifications can be made thereto without going beyond its ambit.

The invention claimed is:

1. An inspection device for inspecting the rings and the necks of containers (2), the device comprising:

movable equipment (6) driven relative to a frame (7) with reciprocating motion along a travel direction parallel to the axis of symmetry of the containers and with a maximum stroke, the movable equipment being provided with an external gauge (14) for inspecting the outsides of the rings of containers and with an internal gauge (15) for inspecting the insides of the rings and of the necks of containers, the external and internal gauges (14, 15) being mounted to be movable independently of each other and relative to the movable equipment (6) in a travel direction parallel to the travel direction of the movable equipment;

a measurement system (30) for measuring the position of the movable equipment (6) relative to the frame, in the travel direction, the measurements of the position of the movable equipment being supplied to a processor unit (31);

a detection system (35) for detecting contact occurring between the internal gauge (15) and the container (2) during movement of the movable equipment (6), occurrences of contact being supplied to the processor unit (31);

a detection system (37) for detecting contact occurring between the external gauge (14) and the container (2) during movement of the movable equipment, occurrences of contact being supplied to the processor unit (31); and a processor unit (31) acting as a function of the measurements of the position of the movable equipment (6) and of occurrences of contact between the gauges (14, 15) and the container (2) to determine whether the rings and/or the necks of the containers have dimensions that are in compliance and to determine the types of defect for containers that are dimensionally not in compliance;

the device being characterized in that each detection system (35, 37) for detecting contact with a gauge comprises:

an emitter and receiver system (70) for emitting and receiving a light beam (71) in a direction parallel to the travel direction of the movable equipment and over a segment of length that is not less than the maximum stroke of the movable equipment (6), the emitter and receiver system being carried by the frame; and a movement transformation mechanism (72, 73) carried by the movable equipment (6), for transforming the travel movement of the gauge (14, 15) relative to the movable equipment (6) into a movement that obstructs or ceases to obstruct the light beam (71) in order to detect the occurrence of contact with the gauge regardless of the position of the movable equipment (6).

2. A device according to claim 1, characterized in that the movement transformation mechanism (72, 73) transforms the linear travel movement of the gauge (14, 15) into pivoting movement of a target (74) in a plane containing the light beam.

3. A device according to claim 2, characterized in that the movement transformation mechanism (72, 73) includes a scissors mechanism (75) hinged and mounted between the movable equipment (6) and the gauge (14, 15).

4. A device according to claim 1, characterized in that the movement transformation mechanism (72, 73) transforms the linear travel movement of the gauge into rotary movement in a plane perpendicular to the direction of the light beam.

5. A device according to claim 4, characterized in that the movement transformation mechanism (72, 73) includes a helical connection (81) associated with a planar linkage (82).

6. A device according to claim 1, characterized in that the emitter and receiver system (70) for emitting and receiving the light beam comprises an emitter (E) and a receiver (R) for a light beam (71) that are mounted facing each other and that are spaced apart from each other by at least the maximum stroke of the movable equipment (6).

7. A device according to claim 1, characterized in that the emitter and receiver system (70) for emitting and receiving the light beam comprise an emitter (E) and a receiver (R) of the light beam that are mounted together with an optical reflector ($R_1$) being mounted opposite them.

* * * * *